United States Patent [19]

Haigh

[11] 4,413,570

[45] Nov. 8, 1983

[54] TABLE EASILY ASSEMBLED FROM STANDARDIZED PARTS AND CORNER CLAMPING ASSEMBLY USABLE THEREWITH

[75] Inventor: Paul Haigh, New York, N.Y.

[73] Assignee: Knoll International, Inc., New York, N.Y.

[21] Appl. No.: 125,206

[22] Filed: Feb. 27, 1980

[51] Int. Cl.³ ................................................ A47B 3/06
[52] U.S. Cl. ...................................... 108/153; 52/656; 108/156; 403/172
[58] Field of Search .................. 108/153, 156, 161; 52/656, 288, 280; 403/172, 176

[56] References Cited

U.S. PATENT DOCUMENTS

| 1,796,024 | 3/1931 | Hohler | 52/288 |
| 1,921,303 | 8/1933 | Raschka | 52/288 |
| 2,666,508 | 1/1954 | Nardulli | 52/656 |
| 2,904,360 | 9/1959 | Gamlen | 403/172 |
| 2,956,705 | 10/1960 | Clingman | 403/172 |
| 3,877,138 | 4/1975 | Suchowski | 52/656 |
| 4,126,364 | 11/1978 | Reilly | 52/280 |
| 4,188,764 | 2/1980 | Gode | 52/656 |

FOREIGN PATENT DOCUMENTS 1161976  3/1958  France ................................. 108/155

Primary Examiner—Francis K. Zugel
Attorney, Agent, or Firm—Robert Scobey

[57] ABSTRACT

Described is a table easily assembled from a number of uniform components including rail and leg members secured together at the corners of the table by a clamping assembly. The clamping assembly can be used for this as well as other uses and includes an inner bracket having three mutually perpendicular arms underlying ends of respective rail and leg members, and an outer bracket fitting thereover.

20 Claims, 13 Drawing Figures

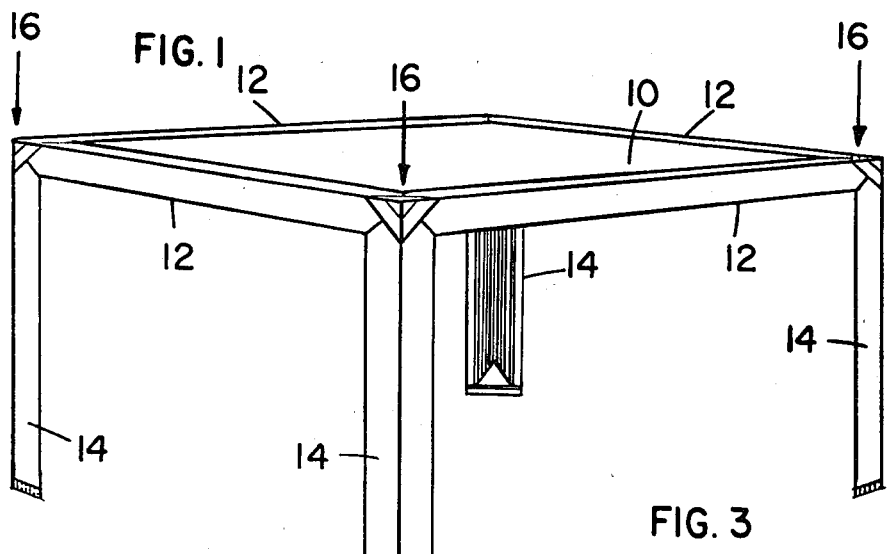
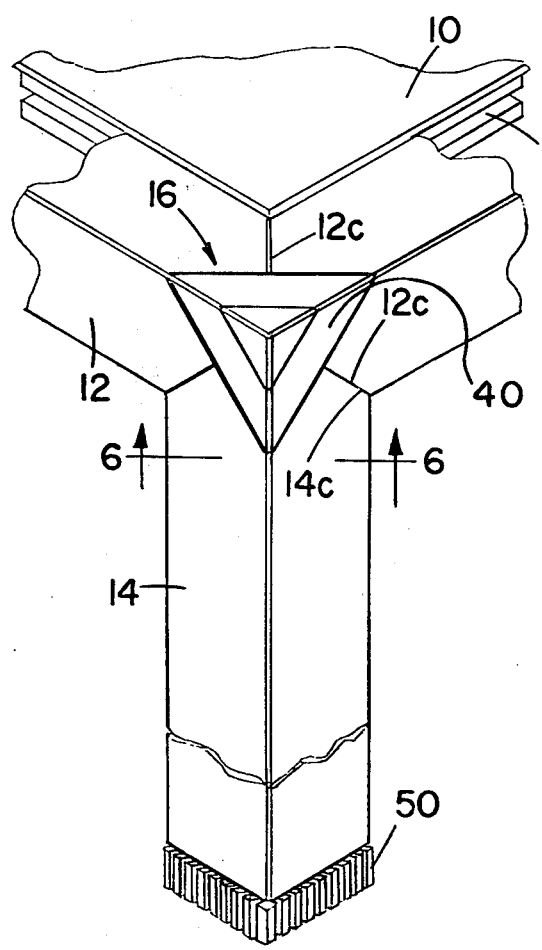
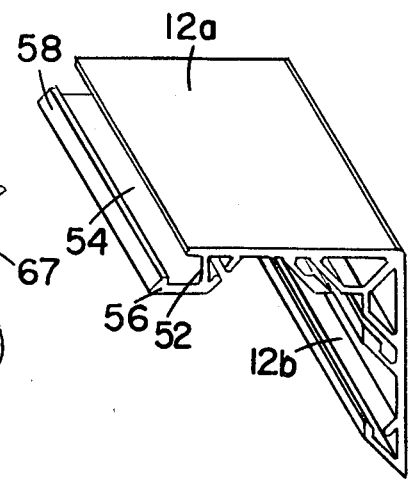
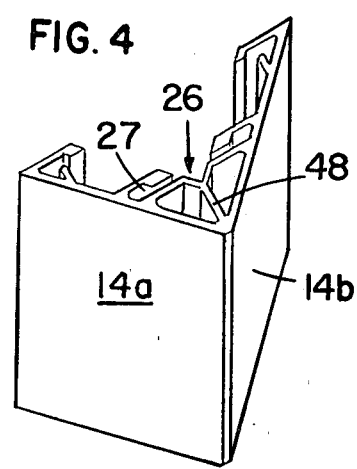

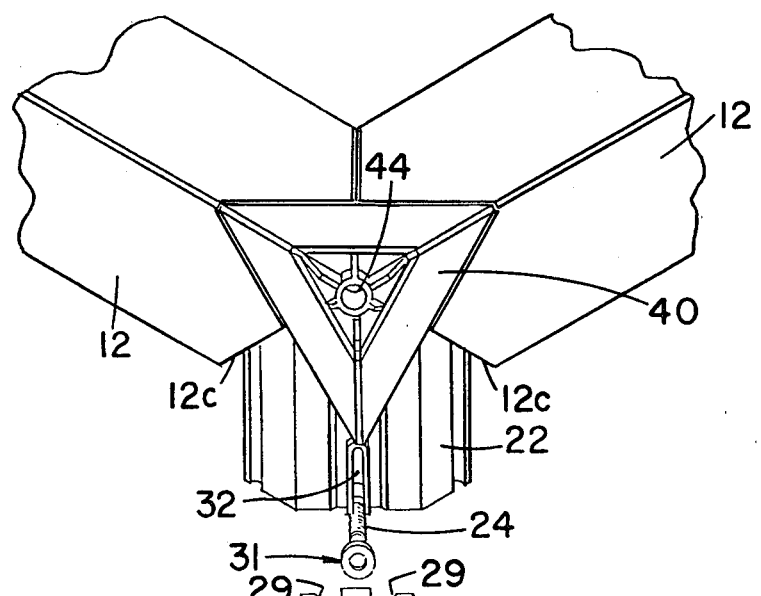
FIG. 7
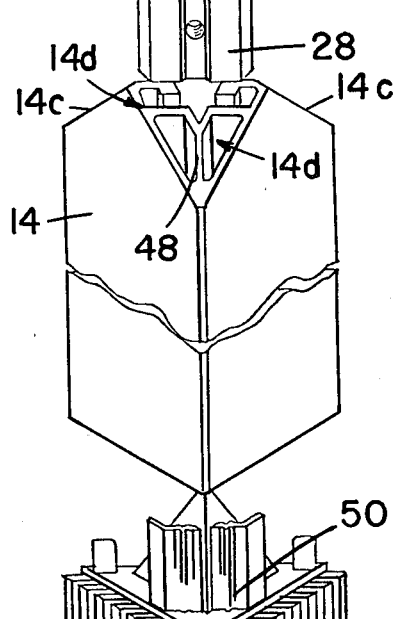
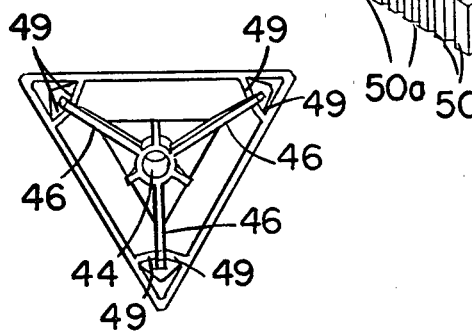
FIG. 8
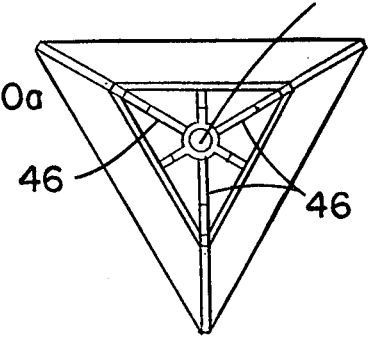
FIG. 9

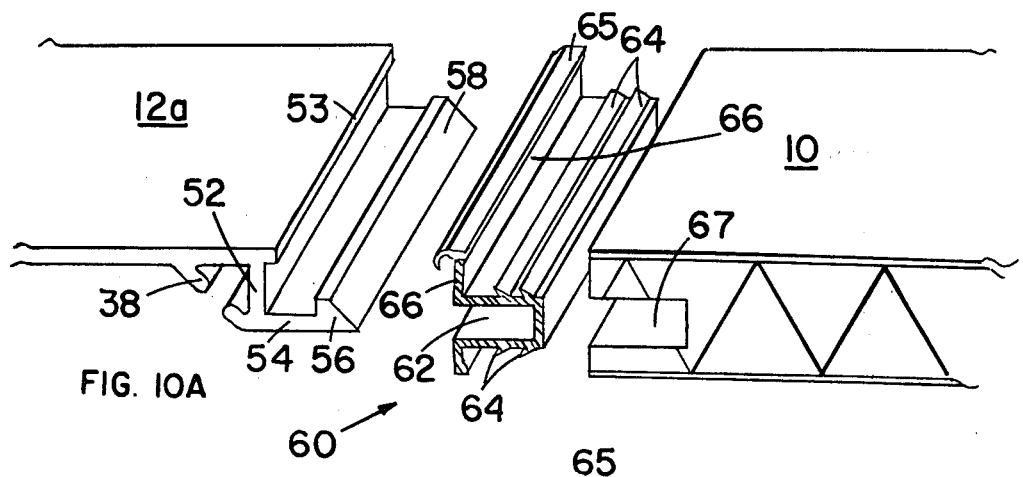
FIG. 10A
FIG. 10B
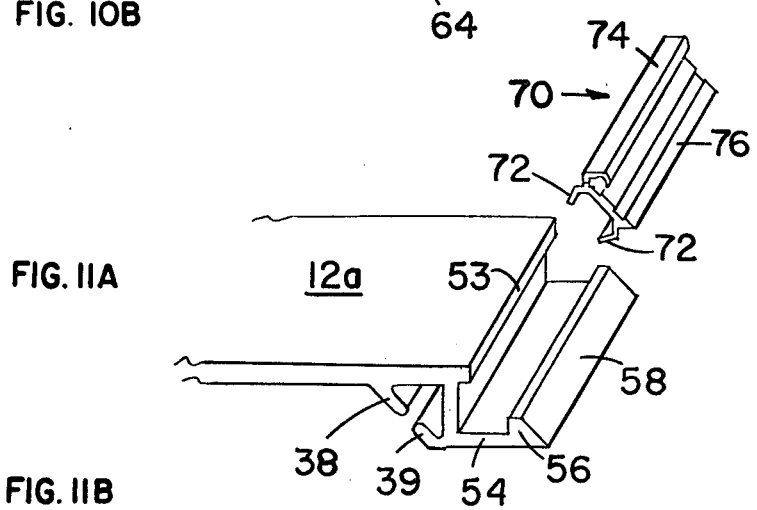
FIG. 11A
FIG. 11B

TABLE EASILY ASSEMBLED FROM STANDARDIZED PARTS AND CORNER CLAMPING ASSEMBLY USABLE THEREWITH

The present invention relates to a table which may be assembled easily from standardized parts and, additionally, to a corner clamping assembly usable therewith.

Many forms of tables which may be shipped or stored in an unassembled condition have been proposed. Assembly of such tables in the field, however, has often been time consuming and the assembled tables typically did not have the stability and strength desired because the clamping assemblies used to hold the parts of the tables together were often inadequate. Further, it was often necessary for a seller of such tables to maintain a relatively large number of components on hand in order to be able to supply tables of differing dimensions. It is, therefor, an object of the present invention to provide a table which may be assembled quickly and easily in the field, and yet will still have extreme stability and strength.

An additional object of the present invention is to provide a table made from standardized parts and yet the dimensions or style of an assembled table may be altered by substituting for only a few of those parts.

A further object of the present invention is to provide a clamping assembly which may hold the assembled parts securely together.

According to the present invention, an assembly is provided for clamping a plurality of members securely together at a common corner. These members may form part of a frame for supporting a table top, and the clamping assembly includes an inner bracket having a plurality of arms each adapted to underlie an end portion of a respective member. Means are provided which include holding elements engaging respective arms for holding the members securely to the inner bracket, and an outer bracket is provided which is adapted to fit over facing end surfaces of the members while being held securely thereover by a second holding element extending from the inner bracket generally in a direction centrally through the intersection of the longitudinal axes of the arms. The members may each be generally angular in cross section with each arm of the inner bracket having outboard portions extending laterally from the respective longitudinal axes for engaging side portions of the respective members. Coacting means thus may be formed respectively on the outboard portions of the inner bracket and the side portions of respective members for spacing the arms from the respective members to increase the holding forces applied by the first holding elements while, at the same time, holding the side portions securely to the outboard portions to reduce twisting of the members about the axes of the arms. In preferred form, the coacting means are formed by a groove portion carried by each respective outboard portion, a respective rib formed along an inner wall of each side portion and adapted to fit within the respective groove portions, and respective flange portions extending inwardly from the side portions and adapted to lie behind the respective groove portions.

Additionally, the members may each be formed with respective trackways having the longitudinal axes thereof each adapted to lie parallel to the axis of the respective arm therebelow. The holding means may thus include a plurality of inserts each receivable slidably in a respective one of the trackways and held to respective one of the first holding elements. These inserts preferably each include outer portions extending laterally and having inclined surfaces for facing correspondingly inclined surfaces on the respective trackway whereby the inserts can be wedged tightly within the trackway by the holding means.

Preferably, the facing end surfaces of the members are each beveled to slope inwardly towards one another to form a symetrical recess and the outer bracket is adapted to fit within this recess. Further, the outer bracket may have a central opening receiving the second holding element, and a plurality of support ribs extend radially from the central opening and each align with a respective member. The outer portions of these support ribs may be flanked by raised portions to form a notch over the respective support rib, and the members would then each include a longitudinal strut element extending to the end surface thereof and adapted to fit within a respective notch when the elements are aligned with the outer bracket.

When said members form parts of a frame for supporting a table top, the members are preferably constituted by two rail members extending generally perpendicular in a common plane and a leg member adapted to depend perpendicularly from the plane. Preferably, the leg and rail members are generally angular in cross section and are each formed of a length of an extruded material. The rail members preferably have one side wall adapted to lie horizontally, and this side wall includes means for holding a table top.

The means for holding a table top may include a spacing flange depending from the side edge portion of the horizontal side wall of the rail member and a ledge portion extending outwardly from the lower portion of this spacing flange. The forward portion of the ledge portion is raised upwardly and has its leading surface sloped back towards the side edge. The table top may be formed of several different materials, such as a material having a soft core or a material having a harder core which can not be easily formed, such as plate glass. In the former case, the means for holding the table top may further include an edge insert having a channel portion with barb portions formed in its outer wall portions, and a gasket portion spaced above the channel portion. The channel portion is adapted to fit within a recess formed in the soft core of the table top with the gasket portion lying adjacent the upper surface of the table top whereby the ledge portion can be inserted into the channel portion to force the barb portions into the soft core while the gasket portion lies between adjacent surfaces of the table top and horizontal side wall of the rail member. The means for holding a table top which may not have a recess as noted above formed easily in its core may alternatively include an edge insert wedged within the space between the horizontal side wall and the ledge portion, and this type of edge insert may also include a gasket portion lying adjacent the upper surface of the horizontal side wall so that a table top having a beveled edge may be supported on the sloped leading surfaces of the various ledge portions while the gasket portions lie between the adjacent surfaces of the table top and horizontal side wall. Both of these edge inserts are preferably formed as a co-extrusion of two resilient materials with the gasket portions being formed of a material more resilient than a remainder of the edge insert.

Other features, advantages and objects of the present invention will become apparent from the following description of a preferred embodiment thereof taken in conjunction with the following drawings, in which:

FIG. 1 is a perspective view of an assembled table according to the present invention;

FIG. 2 is an enlarged corner view of the table of FIG. 1, with parts broken away;

FIG. 3 is a perspective view of a portion of a rail member of FIG. 1;

FIG. 4 is a perspective view of a portion of a leg member of FIG. 1;

FIG. 7 is an exploded view illustrating the assembly of a leg member of FIG. 1;

FIG. 8 is a perspective view of the underside of the outer bracket which illustrates its relation to the end of a leg or rail member;

FIG. 9 is a top plan view of the outer bracket;

FIG. 10A is an exploded view of the means for holding a table top having a soft core;

FIG. 10B illustrates the assembled condition of the components of FIG. 10A;

FIG. 11A is an exploded view of the components used to hold a table top which does not have a core easily formable;

FIG. 11B illustrates the components of FIG. 11A in assembled condition.

Figure 5:
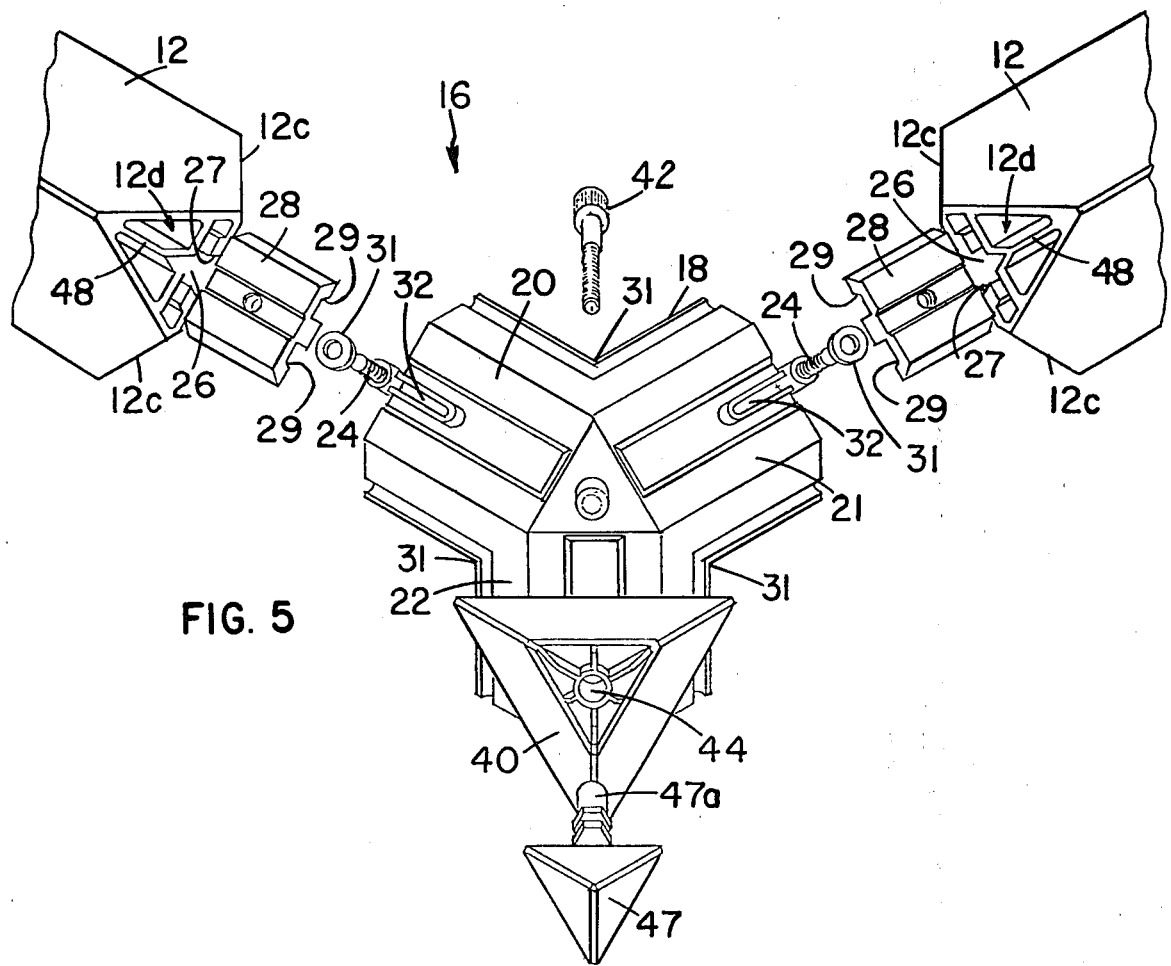
FIG. 5 is an exploded view illustrating initial assembly of the corner of FIG. 1.

A table constructed according to the present invention is illustrated in FIG. 1 and includes a top 10 supported by a frame comprised of rail members 12 and leg members 14. These rail and leg members are secured firmly together at corner portions of the table by clamping assemblies 16.

The rail members and leg members are preferably angular in cross section and portions of each are shown in FIGS. 2 and 3, respectively. The rail members 12 each include side portions or panels 12a and 12b extending perpendicularly from one another, while the leg members 14 each include side portions 14a and 14b also extending perpendicularly from one another. The rail and leg members are preferably formed as an extrusion of a suitable material, such as an aluminum alloy, and have the sides of adjoining ends mitered at 12c and 14c respectively so they may fit together in the corners of the table. Further, the ends of the rail members 12, as shown in FIG. 5, and the upper end of each leg member 14, as shown in FIG. 7, have the outwardly facing surfaces thereof beveled, at 12d and at 14d respectively, in order to slope inwardly toward one another and thus form symetrical recesses at the corners of the table when they fit together.

The rail members and leg members are clamped securely together at the corners of the table by clamping assemblies such as that shown in FIG. 5. The clamping assemblies each include an inner bracket 18 having a plurality of arms each adapted to underlie an end portion of a respective rail member or leg member of the frame. In the illustrated embodiment, the three arms are identical and extend in mutually perpendicular directions. Two arms 20 and 21 extend generally perpendicularly with their longitudinal axes lying in a common plane in order to underlie respective rail members 12, and arm 22 depends perpendicularly therefrom so as to be able to underlie a leg member 14.

The rail members and leg member may be slid over respective arms of the inner bracket 18 and are held thereto by the threaded holding elements 24, as will be set forth more fully below, or by other suitable structures holding the rail or leg members and inner bracket together. The threaded elements 24 are anchored to a respective leg or rail member preferably by forming each of the rail and leg members with respective trackways 26 having their longitudinal axes adapted to lie parallel to the axis of the respective arm of the inner bracket. A plurality of inserts 28 are receivable slidably in respective ones of the trackways 26. The sliding inserts 28 include outer portions 30 extending laterally and having inclined surfaces 29 facing and riding on correspondingly inclined surfaces 27 of the trackways 26. These inclined surfaces enable the sliding inserts 28 to be wedged tightly to the trackway when the threaded elements 24 are tightened as set forth below.

The arms of the inner bracket 18 each include a central portion having a slotway 32 extending along the longitudinal axis thereof. The slotways extend inwardly from the outer edge of the respective arm and are adapted to receive the shank portions of the respective threaded elements 24. Consequently the leg and rail members can be assembled to the inner bracket in a simple manner. Initially, the sliding inserts 28 may be placed within their respective trackways 26 and the ends of the threaded elements are screwed into the sliding inserts after being passed through respective lock washers 31. The rail or leg members may then be slid over respective arms of the inner bracket until the leading edge of the arm or leg member abuts against the shoulder provided by the right angle corner 33 formed at each intersection of the arms of the inner bracket. The leg or rail member would thus be in proper position and may be securely held to the respective arms of the inner bracket by simply turning the threaded element 24 by an appropriate tool engaging the enlarged head portion lying behind the respective slotway. Alternatively, the inserts 28 may first be held to the respective arm of the inner bracket with the slotway 26 of the respective rail or leg member then slid thereover.

Figure 6:
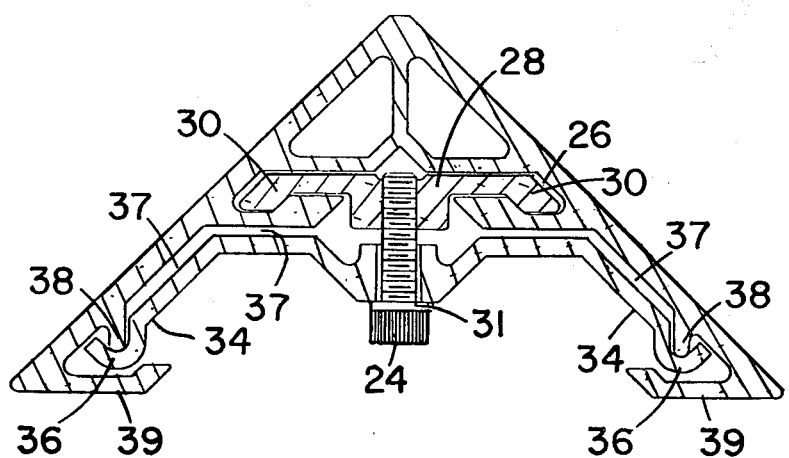
FIG. 6 is a cross section taken through lines 6—6 of FIG. 2.

The arms of the inner bracket preferably engage the respective rail or leg member at outer portions thereof only. Each arm of the inner bracket has outboard portions 34 extending laterally from the longitudinal axis of the arm and it is these outboard portions of the arms which engage the respective rail or leg member. As illustrated in FIG. 6 for a leg member 14, this engagement results from coacting structures formed respectively on the outboard portions of the arm and the side portions of the leg member. More particularly, these coacting structures are formed by groove portions 36 carried on the outer end of the respective outboard portions, and a respective rib 38 formed along the inner wall of each side portion and adapted to fit within the respective groove portion 36. Further, respective flange portions 39 may extend inwardly from the side portions and are adapted to lie behind respective groove portions 36. In this way, the arms of the inner bracket 18 are spaced at 37 from the respective leg and rail members so that the holding forces applied by the threaded element 24 will be applied to only outer portions of the arm and respective leg or rail member. These holding forces will thus take the form of moment forces acting on the coacting structures and will thus be greatly increased over any axial force that would otherwise be applied by the threaded elements. Further, the rail and leg members will be held at their outer lateral portions and thus their tendency to twist will be reduced.

The clamping assemblies 18 each further include an outer bracket 40 which fits over the facing end surfaces of the rail and leg members held by the inner bracket and is securely held to the inner bracket by appropriate means such as the threaded element 42. The outer bracket 40 is shaped to fit within the symetrical recess formed by the beveled ends of the rail and leg members and the threaded element 42 extends from the back side of the inner bracket 18 in a direction centrally through the intersection of the longitudinal axes of the inner bracket arms to lock the rail and leg members securely to the inner bracket 18.

The outer bracket 40 preferably has a central opening 44 holding the end portion of the threaded element 42, and a plurality of support ribs 46 extend radially from the central opening and align with strut elements 48 formed in the rail and leg members. The strut elements 48 extend longitudinally along the rail and leg members and provide additional rigidity to the members. Additionally, the support ribs 46 may have their outer portions flanked by raised portions 49 to form a notch 49a over the respective support rib. The strut elements 48 are adapted to fit within the respective notches and, in this way, serve to align the outer bracket properly with the rail and leg members. As illustrated in FIG. 5, the outer bracket 40 may be formed in two parts and include an outer cap 47 preferably made from a resilient material and including a shaft portion 47a which may be press fitted into the central opening 44. The shaft portion includes a hexagonal enlargement 47b which engages ribs 46.

The clamping assembly 16 thus includes an inner bracket holding the leg and rail members, and, additionally, an outer bracket fitting thereover to provide a high degree of strength and stability to the corner of the table. Further, a table or other device held together by such a clamping assembly can be erected quite easily in the field within a minimum of manhours. For example, the table of the illustrated embodiment could be stored and shipped with the rail members 12 fitted and secured to the clamping assemblies 16, and the leg members can be placed within the frame. Consequently, to complete assembly of the table later, one need only loosen threaded element 42 and the threaded elements 24 associated with the arms the leg members are to be fitted to. The leg members can thus be slid over the appropriate arms and thereafter the threaded elements can be re-tightened. Appropriate inserts 50 may be fitted within the bottom of the leg members either at the factory or later in the field. These inserts 50 are preferably made from a non-scratching material such as nylon and preferably have flutes 50a extending along the side and bottom surfaces in order to provide glides for the table.

An important feature of the present invention is the simple manner in which either of two different table tops may be held to the frame. As shown clearly in FIG. 3, the side wall 12a of each rail member is adapted to lie horizontally, and this horizontal side wall 12a includes a spacing flange 52 depending from the side edge 53 thereof. A ledge portion 54 extends outwardly from the lower portion of the spacing flange, and the forward position 56 of the ledge portion is raised upwardly with its leading surface 58 sloped back towards the side edge of the wall 12a. These structures at the edge of the side wall 12a are able to receive either one of two edge inserts 60 and 70 illustrated in FIGS. 10 and 11, respectively.

Edge insert 60 is preferred for use with a table top formed from a material having a soft core, such as a laminate having outer layers of an impact resistant plastic material and an inner layer of a cellular material such as the honeycomb material NORCORE. The edge insert 60 includes a channel portion 62 having barbs 64 running along its outer wall portions. A gasket portion 65 is spaced above the channel portion 62 by web 66. As illustrated in FIGS. 10A and 10B, the channel portion 62 is fitted within a recess 67 formed in the soft core of the table top. The leading surface 58 is then inserted into the channel portion 62 and the forward portion 56 is forced into the channel portion to spread the walls thereof slightly to force the barbs against the soft core material. The web 66 is of sufficient height to place the gasket portion between the adjacent surfaces of the table top and side wall 12a of the rail member. The rail member, as noted above, is formed by extrusion of a material such as aluminum alloy and the table top is clearly formed of different materials by a different process. It is thus difficult to assure the proper fit between the two components since they cannot be made with the same tolerance for error. The gasket portion 65 thus serves as a compressable gasket to assure proper fit between the components.

The edge insert 70 is preferred for use with a table top which does not have a soft core, i.e., a core in which the recess 67 cannot be formed easily, and includes wing portions 72 wedged within the space between the ledge portion 54 and the sidewall 12a. The edge insert also includes a gasket portion 74 at its upper end and provides a beveled surface 76 aligning with the slope of the leading surface 58 of the ledge portion. As shown in FIG. 11B, the beveled surface 76 and sloped leading surface 58 porivde a beveled seat for receiving the correspondingly beveled edge 10a of a table top 10, and the gasket portion 74 functions in a manner similar to the gasket portion of the insert 60. The edge insert 70 can be used to hold a table top of relatively heavy materials, such as plate glass or marble, and the top will be self-leveling.

As noted above, the table top can be held firmly to the frame, particularly when insert 60 is used. Consequently, the table top itself adds rigidity to the assembled table.

Preferably, the gasket portions of the edge inserts 60 and 70 are made more resilient than the remainder of the insert. This can be accomplished by forming the inserts as a co-extrusion of two resilient synthetic materials with the gasket portions being formed from the more resilient material.

As can be seen from the above, a table of high stability is provided which not only can be assembled easily, but its dimensions and even style can be altered quite easily. Several different types of table tops, such as plate glass, marble or a plastic laminate, can be used interchangeably and only the edge inserts need be changed. Further, the table top can be of any thickness, particularly when insert 70 is used. Further, the lengths of the rail members of leg members can be changed quite easily to alter the dimensions of the table. And since all the leg members and rail members can be formed from only two extruded lengths appropriately cut and beveled, the costs for manufacturing the table or producing a custom table of an unusual size are greatly reduced.

The important features of the present invention have been described as embodied in the illustrated table. These important features, however, may be employed in other embodiments and still fall within the scope of the present invention which is intended to be defined by the appended claims.

What is claimed is:

1. An assembly for clamping a plurality of members securely together at a common corner, including an inner bracket having a plurality of arms each adapted to underlie an end portion of a respective member, means including first holding elements engaging respective arms for holding said members securely to said inner bracket, and an outer bracket adapted to fit over facing end surfaces of said members while being held securely thereover by a second holding element extending from said inner bracket generally in a direction centrally through the intersection of the longitudinal axes of said arms.

2. An assembly according to claim 1, said members each being generally angular in cross section with each arm of said inner bracket having outboard portions extending laterally from the respective longitudinal axis for engaging side portions of the respective member, and coacting means formed respectively on said outboard portions of the inner bracket and said side portions of respective members for spacing said arms from the respective members to increase the holding forces applied by said first holding elements while holding said side portions securely to said outboard portions to reduce twisting of said members about said axes.

3. An assembly according to claim 2, said coacting means being formed by a groove portion carried by each respective outboard portion, a respective rib formed along an inner wall of each said side portion and adapted to fit within the respective groove portion, and respective flange portions extending inwardly from said side portions and adapted to lie behind said respective groove portion.

4. An assembly according to any of claims 1, 2 or 3, said members each being formed with respective trackways having the longitudinal axes thereof each adapted to lie parallel to said axis of the respective arm therebelow, and said first holding elements including a plurality of inserts each receivable slidably in a respective one of said trackways and held by means forming part of a respective one of said first holding elements.

5. An assembly according to claim 4, said inserts each including outer portions extending laterally and having inclined surfaces for facing correspondingly inclined surfaces on the respective trackway whereby said inserts can be wedged tightly within said trackway by said holding means.

6. An apparatus according to claim 1, said facing end surfaces of said members each being beveled to slope inwardly towards one another to form a symetrical recess, said outer bracket being adapted to fit within said recess.

7. An apparatus according to claim 6, said outer bracket having a central opening receiving said second holding element, and a plurality of support ribs extending radially from said central opening and each aligning with a respective member.

8. An apparatus according to claim 7, the outer portions of said support ribs being flanked by raised portions to form a notch over the respective support rib, and said members each including a longitudinal strut element extending to the end surface thereof and adapted to fit within a respective notch when said members are aligned with said outer bracket.

9. An apparatus according to claim 1, said members each forming part of a frame for supporting a table top, said members being constituted by two rail members extending generally perpendicularly in a common plane and a leg member adapted to depend perpendicularly from said plane.

10. An apparatus according to claim 9, said leg and said rail members being generally angular in cross section with said rail members having one side wall adapted to lie horizontally, said horizontal side wall including means for holding a table top.

11. An apparatus according to claim 10, said leg and rail members each being formed as a length of an extruded material.

12. An apparatus according to claim 10, said means for holding a table top including a spacing flange depending from the side edge portion of said horizontal side wall and a ledge portion extending outwardly from the lower portion of said spacing flange, the forward portion of said ledge portion being raised upwardly and having its leading surface sloped back towards said side edge.

13. An apparatus according to claim 12, said table top being formed from a material having a soft core, said means for holding the table top further including an edge insert having a channel portion with barb portions formed on its outer wall portions and a gasket portion spaced above said channel portion, said channel portion being adapted to fit within a recess formed in the soft core of the table top with said gasket portion lying adjacent the upper surface of said table top whereby said ledge portion can be inserted into said channel portion to force said barb portions against said soft core while said gasket portion lies between the adjacent surfaces of said table top and said horizontal side wall of said rail member.

14. An assembly according to claim 13, said edge insert being formed as a co-extrusion of two resilient materials with said gasket portions being formed of a material more resilient than the remainder of said edge insert.

15. A frame for supporting a table top, including a plurality of side walls adapted to lie in a common horizontal plane, said horizontal side walls including a spacing flange depending from the side edge portion thereof and a ledge portion extending outwardly from the lower portion of said spacing flange, the forward portion of said ledge portion being raised upwardly and having its leading surface sloped back towards said side edge, and means removably associated with said ledge portion for holding a table top, said table top being formed from a material having a soft core, and said holding means including an edge insert having a channel portion with barb portions formed on its outer wall portions and a gasket portion spaced above said channel portion, said channel portion being adapted to fit within a recess formed in the soft core of the table top with said gasket portion lying adjacent the upper surface of said table top whereby said ledge portion can be inserted into said channel portion to force said barb portions into said soft core while said gasket portion lies between the adjacent surfaces of said table top and said horizontal side wall.

16. A frame according to claim 18, said edge insert being formed as a co-extrusion of two resilient materials with said gasket portions being formed of a material more resilient than the remainder of said edge insert.

17. An assembly for clamping together a plurality of frame pieces at a common corner comprising a first bracket having a plurality of arms, each frame piece including a first channel therein for slidably receiving one of said arms and a second channel for slidably receiving a holding element, a connector joining together each of said arms and an associated one of said holding elements to clamp said arm and holding element against the corresponding frame piece, each arm bearing only against spaced-apart portions of said first channel, said holding element bearing only against spaced-apart portions of said second channel.

18. An assembly as in claim 17, in which each frame piece is triangular in section, and in which said spaced-apart portions of said first channel are spaced apart by a greater distance than the spacing between said spaced-apart portions of said second channel.

19. An assembly as in claim 17 or 18, including a second bracket overlying a central part of said first bracket from which said arms extend and also overlying beveled edge portions of said frame pieces, and a second connector securing together said first and second brackets and urging said second bracket against said beveled edge portions.

20. An assembly for clamping together a plurality of frame pieces at a common corner and including a first bracket having a central part and a plurality of arms each of which extends from said central part into and is secured to a corresponding channel in one of said frame pieces, each frame piece including a beveled end portion adjacent said central part of said first bracket, a second bracket overlying said central part of said first bracket and said beveled end portions of said frame pieces, said beveled end portions each including a strut thereon, said second bracket including ribs having notches therein that engage said struts, said first and second brackets being joined together to clamp together said frame pieces at said common corner which is rigidified by the engagement of said notched ribs with said struts.

* * * * *